United States Patent [19]
Graber

[11] 3,730,773
[45] May 1, 1973

[54] FLOW VOLUME REGULATING VALVE

[75] Inventor: Carl W. Graber, Lyndhurst, Ohio

[73] Assignee: The Royal Brass Manufacturing Company, Cleveland, Ohio

[22] Filed: June 11, 1971

[21] Appl. No.: 152,228

[52] U.S. Cl. .................138/46, 137/505.41, 137/613
[51] Int. Cl. ............................................F16k 31/145
[58] Field of Search...................137/505.38, 505.39, 137/505.41, 505.42, 513.5; 138/46

[56] References Cited

UNITED STATES PATENTS

| | | | |
|---|---|---|---|
| 2,405,010 | 7/1946 | Bucknam | 137/505.38 X |
| 2,731,299 | 1/1956 | Bramming | 137/513.5 X |
| 3,457,953 | 7/1969 | Warnoke | 137/505.42 X |
| 2,359,111 | 9/1944 | Hughes | 137/505.41 X |

Primary Examiner—Harold W. Weakley
Attorney—John Harrow Leonard

[57] ABSTRACT

The regulator has a valve body with a lineal passage extending therethrough and having an inlet at one end and an outlet at the other. A valve stem is slidable in the passage, fits therein with limited radial clearance, and has an inlet head and an outlet head seatable in the inlet and outlet, respectively. In cross section, the stem and heads are circular and the passage is polygonal, so that, with the radial clearance, a limited flow passage is provided between the wall of the lineal passage and the walls of the stem and seated one of the heads. The length of the stem between the heads is such than when either head is seated the other is unseated. Each head, when seated, restricts, but does not close, its associate end of the limited flow passage which always is open sufficiently to permit the limited flow. The stem is biased by a spring to hold the outlet head normally in its seated maximum restricting position. A housing having an inlet and outlet encloses the valve body. The housing has a cavity which is connected with the outlet of the lineal passage and is closed at one side by a diaphragm which, in response to a build up of pressure in the cavity, moves the stem in opposition to the spring so as to unseat the outlet head and seat the inlet head. The cavity has a continuously open discharge passage, the flow capacity of which is equal to, or less than, that of the restricted flow passage when the heads are unseated, and is equal to, or greater than that of the restricted flow passage when the inlet head is seated.

9 Claims, 13 Drawing Figures

Patented May 1, 1973

INVENTOR.
CARL W. GRABER

BY
ATTORNEY

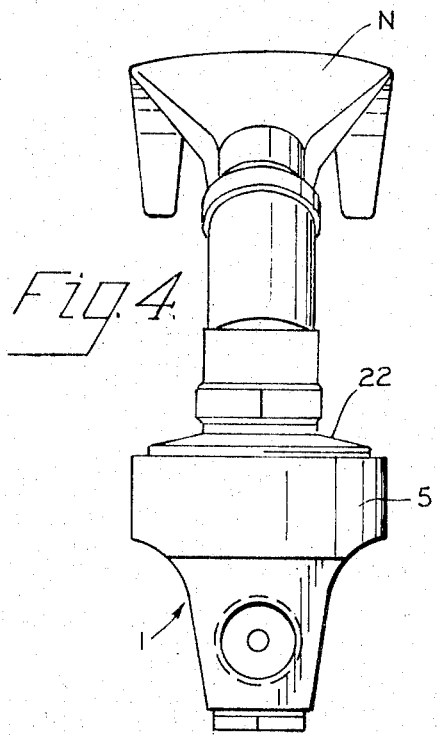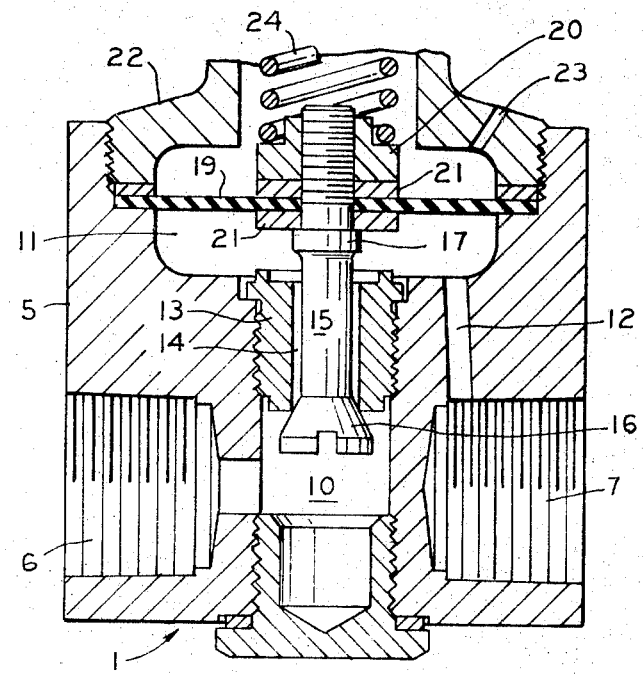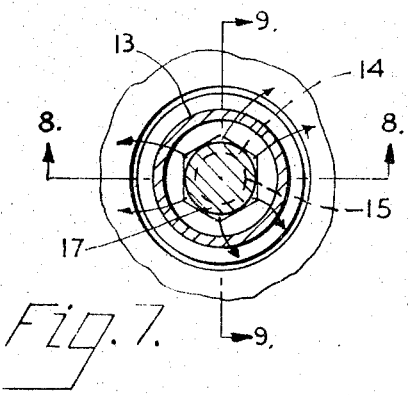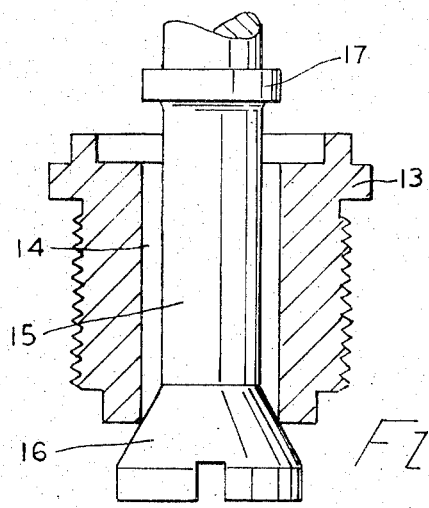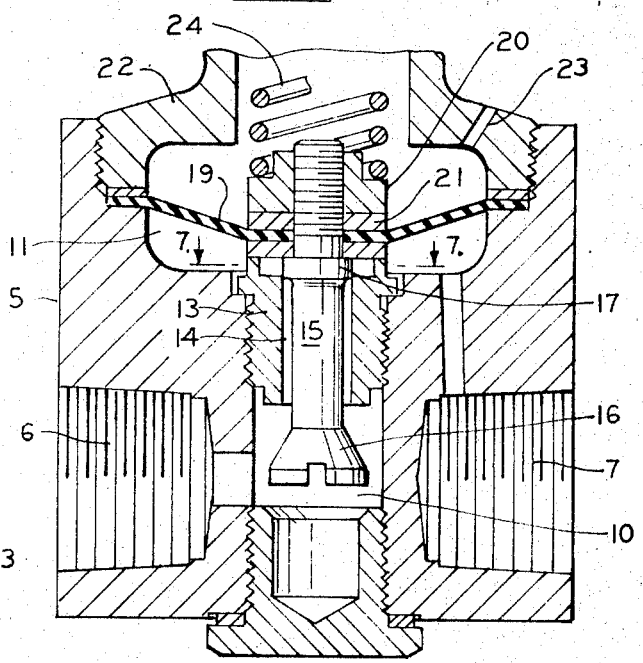

Patented May 1, 1973

INVENTOR.
CARL W. GRABER

BY John H. Leonard
ATTORNEY.

FLOW VOLUME REGULATING VALVE

BACKGROUND

1. Field of Invention

A flow regulator for maintaining a uniform discharge of water under varying line pressures at the regulator inlet.

2. Description of Prior Art

Heretofore, various flow regulators for regulating the volume and force of water discharged therefrom have been provided. Many are used for controlling the volume and force of water discharged from nozzles of drinking fountains. In general, a flow regulator is connected between a manually operable stop cock and the fountain discharge nozzle, or "bubbler," with the inlet of the regulator connected to the outlet of the stop cock and the outlet of the regulator connected to the nozzle. These regulators generally include a diaphragm operated valve which is biased to an unseated position by a spring so as to permit the full flow through the regulator to the nozzle at low line pressures. As the pressure increases, the diaphragm moves the valve progressively toward the seated position in which it stops the flow. One of the principal difficulties with such prior regulators is that they cannot provide a proper flow through at both high and low inlet pressures for emitting at the nozzle a stream with sufficient force so that its trajectory ends at or close to the outlet of the fountain catch basin. If made to provide an adequate flow at low line pressures, then, in the case of a much higher line pressure, the emitted stream all to frequency overshoots the basin. This is particularly true when the line pressure is relatively high and the stop cock is suddenly opened, because then the regulator is subjected not only to the higher line pressure, but also higher pressures occasioned by inertial forces upon the sudden admission of the stream of water into the regulator. Thus either the emitted stream dribbles out of the nozzle at very low inlet pressures and overshoots the basin at high inlet or inertial pressures.

SUMMARY OF INVENTION

The present flow regulator eliminates surges and maintains a relatively uniform flow of water through its outlet throughout a range of varying line pressures, within its rated capacity, from low to high.

The flow regulator is shown herein for illustration as connected to a water supply line between a manual control valve or stop cock V and a drinking fountain discharge nozzle or bubbler N. When so connected it is operative by the pressure of water at the outlet of the regulating valve of the regulator to set a double head valve plug so that - a. when water at low line pressure is admitted by the manual control valve to the regulator, the regulating valve assures that the water will be emitted through the fountain nozzle as a distinct stream which clears the nozzle; and b. when water at high line pressure is admitted to the regulator, either by a sudden increase in the pressure in the mains while the control valve is open, or by opening the manual control valve suddenly while the line pressure is relatively high, the regulating valve eliminates surging through the nozzles and causes the water to be emitted initially therefrom as a stream of such limited force that the water falls into the basin near the nozzle, and then as a progressively more forceful stream which is projected further from the nozzle but limited in force so that water falls into the basin well within its peripheral limits, thus constraining the emitted stream from overshooting the basin at any time.

Various specific objects and advantages of the invention will become apparent from the following description of a preferred form thereof, wherein reference is made to the drawings in which FIG. 1 is a diagrammatic illustration showing an application of the regulator of the present invention to a conventional drinking fountain;

FIG. 4 is a right hand end elevation of the structure shown in FIG. 3;

FIG. 5 is a fragmentary enlarged cross sectional view similar to FIG. FIG. 3 showing the valve of the regulator in operating position when subjected to high inlet pressure;

FIG. 6 is a view similar to FIG. 5 showing the valve when subjected to low inlet pressure;

FIG. 7 is an enlarged fragmentary cross sectional view of the structure of FIG. 6, taken on the line 7—7 of FIG. 6;

FIG. 8 is an enlarged fragmentary longitudinal view of the structure of FIG. 7 taken on the line 8—8 in FIG. 7 showing the valve when it is subjected to high pressure;

Figure 1:
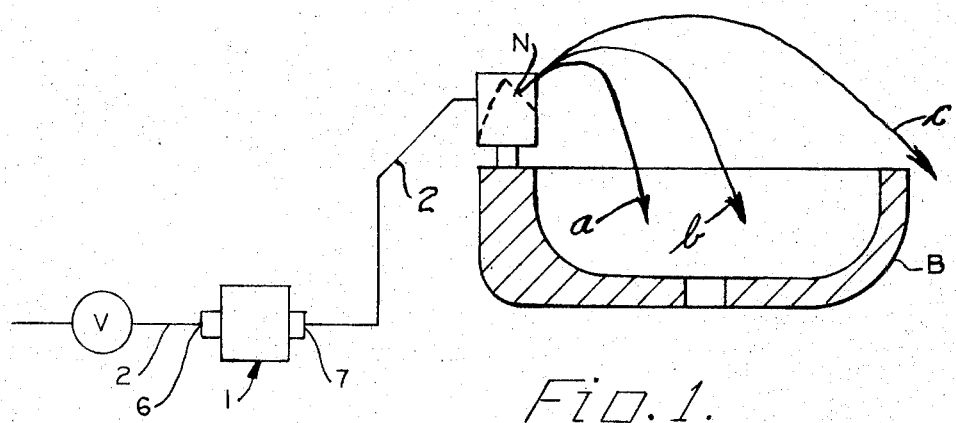
Figure 2:
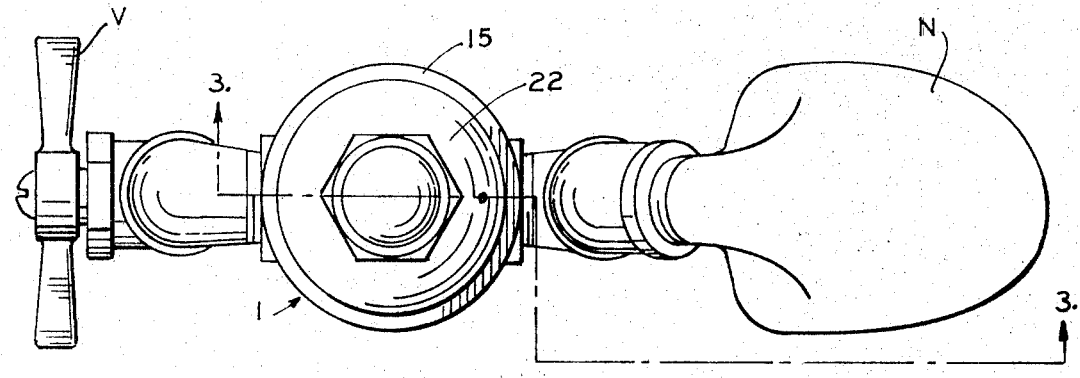
FIG. 2 is a top plan view of the regulator with a manual control valve and a drinking fountain nozzle connected thereto.

Referring to the drawings, the flow regulator, indicated generally at 1, is shown as connected in a pipe line 2 between a manually operable stop cock or control valve V and a nozzle N of a conventional drinking fountain. The nozzle N is intended to emit a stream of water which, in general, has a trajectory which curves downwardly so that the water falls into a catch basin B of the fountain. As heretofore mentioned, the regulator should have an adequate flow at low line pressure so that the water is emitted as a well defined stream which clears the nozzle and enters the basin, as indicated at *a* in FIG. 1, instead of merely dribbling down from the nozzle. At higher pressures the emitted stream also initially should be one, as indicated at *a*, which then almost instantly builds up to a stream, as indicated at *b*, the trajectory of which enters the basin nearer the center of the basin. In no case does the regulator permit a stream, such as indicated at *c*, to be emitted with such force as to overshoot the basin.

In most prior flow regulators, under high inlet pressures, the stream emitted initially is usually one which overshoots the basin, as indicated at c, and then moderates and drops back to the position of the stream indicated at b.

In the present structure, at low line pressure, the stream is emitted consistently initially as indicated at a. The same is true initially at high line or inertial pressures, but the stream then builds up to the position indicated at b. The danger of overshooting is totally eliminated.

Referring next to FIGS. 2 through 6, the regulator 1 comprises a housing 5 having an inlet 6 and an outlet 7 connnected by the line 2 to the nozzle N of the drinking fountain. The housing has a transverse inlet bore 10 which leads from the inlet 6 into a cavity 11. An outlet duct 12 leads from the cavity 11 to the outlet 7. Mounted within the housing 5 between the inlet 6 and cavity 11 is a valve body 13, in the form of a sleeve, having a lineal passage 14 therethrough, and providing the only communication between the bore 10 and the cavity 11. The passage has an inlet at one end in communication with the bore 10 and an outlet at the other end in communication with the cavity 11.

Mounted within the passage 14 for endwise movement relative thereto is a valve stem 15 which carries at the inlet end of the passage 14 a frusto-conical valve head or piston 16 which is adapted to seat in the inlet end of the passage 14 to restrict the flow thereinto. At its opposite end the stem 15 carries a cylindrical valve head or piston 17 which is adapted to seat in the outlet end of the passage 14 to restrict the flow therefrom.

As best illustrated in FIG. 7, the passage 14 is of a different cross sectional shape than the stem 15 and, in addition, the stem 15 fits in the passage with limited radial clearance. Thus a limited flow passage from the bore 10 to the cavity 11 is provided by a space between the stem 15 and the wall of the passage 14. The passage 14 is polygonal in cross section and the stem 15, the inlet head 16, and the outlet head 17 are circular in cross section so that the limited flow passage is never closed entirely but permits a limited flow of water to pass from the bore 10 to the cavity 11, through the radial clearance space, through the space between the corners or vertices of the polygonal passage and the circular stem, and through the clearance between the seated one of the heads and the vertices of the wall of the portion of the passage 14 in which it seats. The head 17 is of such diameter that substantially the only passage around the head 17, when it is seated in the passage 14, is through the space between its periphery and the vertices of the polygonal passage 14.

Each head 16 and 17 merely restricts, but does not close, its associated end of the passage 14, when fully seated. The length of the stem 15 between the heads 16 and 17 is such, relative to the length of the passage 14, that when one of the heads 16 and 17 is seated, the other is unseated. Thus the limited flow passage through the valve body 13 is never closed, but only restricted.

There is also a definite relation between the flow capacity of the limited flow passage and that of the outlet duct 12. This relation is such that the flow capacity of the outlet duct 12 is equal to or less than the flow capacity of the limited flow passage when both the heads 16 and 17 are unseated. On the other hand, the capacity of the outlet duct 12 is equal to or greater than that of the limited flow passage when the inlet head 16 is seated. Furthermore, the outlet head 17 is shorter than the inlet head 16, to allow for a quicker unseating for better low pressure flow before the head 16 seats.

Since the valve is to function automatically, the cavity 11 has one side wall in the form of a diaphragm 19. The upper end of the stem 15, beyond the head 17, extends through the diaphragm and is threaded and connected to the diaphragm by means of a suitable nut 20 and washers 21. Since the head 17 can slide through the passage 14, the stem and diaphragm can be assembled by inserting the stem, head 17 foremost, through the passage 14 from the inlet end thereof. The peripheral margin of the diaphragm 19 is firmly clamped in sealed relation against a shoulder in the housing 5 by means of a cap 22 which is screw threaded into the housing 5. The cap 22 is provided with a bleeder duct 23 to afford ready escape of air from between the cap and the diaphragm at the upper face of the diaphragm. The diaphragm 19, and thereby the stem 15, are biased by a biasing spring 24 to a position in which the head 17 is disposed in its fully restricting position within the outlet end portion of the passage 14. The diaphragm 19, therefore, is responsive to the water pressure in the cavity 11 which is continuously in communication with the continuously open discharge duct 12. The pressure may vary from substantially zero to a pressure beyond that at which the spring can maintain the head 17 seated in its restricting position.

The diaphragm 19 is forced upwardly in a manner such that first, it lifts the head 17 out of its restricting or seated position, and then, with a slight additional movement, it seats the head 16 in its restricting or seated position.

A suitable adjusting nut 25 is prefitted into the neck of the cap 22 for adjusting the compression of the spring 24 thereby to preselect the pressure in the cavity 11 at which the valve responds, and thereby the degree of valve movement at the different pressures. The lower washer 21 is arranged to engage the upper end of the body 13 and limit the degree to which the stem can be moved downwardly by the spring during adjustment, so as to protect the parts and prevent overstressing of the diaphragm and valve head 17.

With a low input pressure applied to the inlet 6, the head 16 is unseated in a fully non-restricting position and the head 17 is in fully seated position in which it allows a substantial, but limited flow into the cavity 11.

The regulating screw 25, by regulating the compression of the spring 24, regulates the position of the head 17 with respect to the outlet end of the passage 14 to permit maximum restricted flow for a selected low pressure. The flow capacity of the duct 12 is equivalent to, or less than, the passage between the stem 15 and the wall of the passage 14 when both heads are unseated. When the pressure at the inlet end of the passage 14 increases, it forces more water through the limited flow passage. The pressure created by the increased volume of water due to the limited size of the outlet duct 12, raises the diaphragm, thus raising the stem 15 and thereby the heads 16 and 17 so that while the head 17 is moved to a less restricting position, the head 16 is progressively restricting the inlet end of the passage 14, the volume of water passing through the limited flow passage between the head 16 and inlet to the passage 14 is never greater than the water passing through the outlet duct 12.

It is noted that the duct 12 is much smaller than the outlet 7 or the housing 5. Furthermore, in installations, the regulator 1 is below the level of the outlet of the nozzle N so that the bore 10, passage 14, limited flow passage, the cavity 11, the duct 12, and the outlet 7 are always filled with water under a limited head. As a result the regulator is almost instantly responsive to a change in pressure. This change in pressure may be created by a change in the pressure of the mains. It also may be by inertial forces due to the sudden opening of the valve V and resultant introduction of pressure of the main against the static column between the nozzle N and the outlet end of the passage 14. However, since there is always a flow through the passage 14, regardless of which head 16 or 17 is seated, this sudden change in pressure is damped, the diaphragm 19 becoming almost instantly effective to adjust the valve before an appreciable flow to the nozzle N. In fact, the tendency is for the inlet head 16 to move almost instantly upon the occurrence of such inertial forces occasioned by sudden opening of the valve V at high or low pressures, and as these forces are dissipated or damped, the diaphragm 19 operates to move the inlet head 16 first to a restricting position, and then drops it back to a less restricting position, depending on the pressure. Consequently, instead of the stream emitted from the nozzle having an initial trajectory which overshoots the basin B, the emitted stream has a trajectory which first falls a short distance clear of the nozzle N and then gradually increases, as the head 16 moves back to less restricting position, due to a decrease in inertial or line pressures, so that its trajectory projects farther from the nozzle N and falls into the basin near the center.

Most such nozzles have a discharge opening, such as indicated at 26, which may be larger than the duct 12 and smaller than the passage through the pipe line 2 and the outlet 7. A throttling plug 27 is generally incorporated in the nozzle between its discharge opening and its inlet end. The plug 27 has a plurality of passages 28, each of which has a diameter substantially equal to that of the duct 12. As a result, even though the water may be discharged through the duct 12 as a forcible stream, it is discharged into a larger cross section of water in the line in advance of the nozzle which reduces the flow velocity. This obviously reduces the force with which the water issues to the outlet 26.

Since the head 17 is shorter than the head 16, it moves out of restricting position before the head 16 moves into the restricting position, so that at low pressure there is a free flow through the flow space between the walls of the passage 14 and the stem 15. This may continue as long as the pressure is low. As the pressure increases, the volume of the discharged stream becomes greater. The diaphragm lifts the stem further and moves the head 16 into restricting position. The pressure at which this occurs is determined by the setting of the plug 25 and resultant compression of the spring 24.

Figure 3:
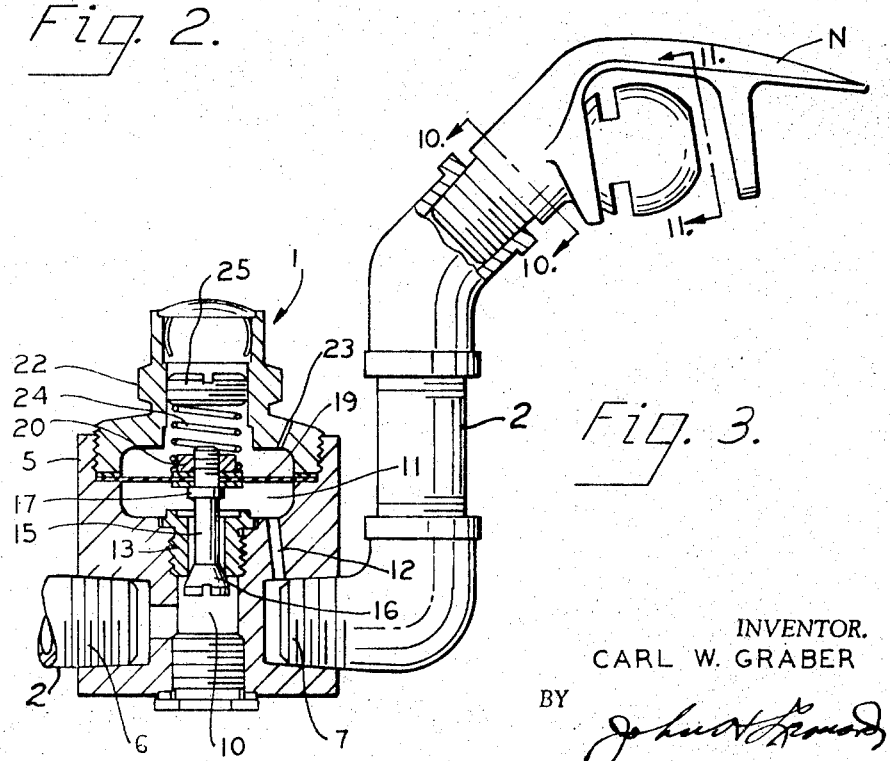
FIG. 3 is a front elevation of the structure illustrated in FIG. 2, part thereof being shown in section as taken on the line 3—3 in FIG. 2.
Figure 8A:
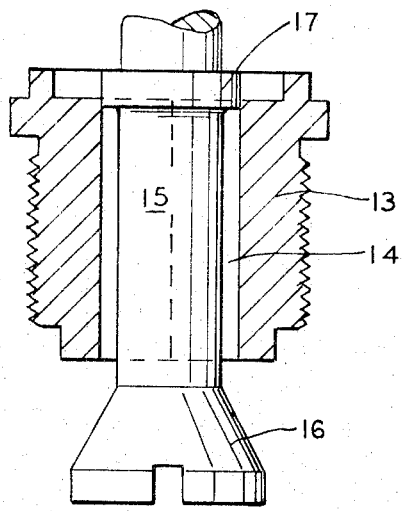
FIG. 8A is a view similar to FIG. 8 showing the valve when it is subjected to low inlet pressure.
Figure 9:
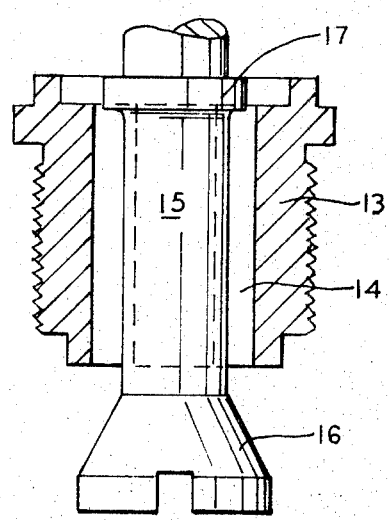
FIG. 9 is a longitudinal sectional view of the valve illustrated in FIG. 7 and is taken on the line 9—9 thereof, but shows the valve when it is subjected to low inlet pressure.
Figure 9A:
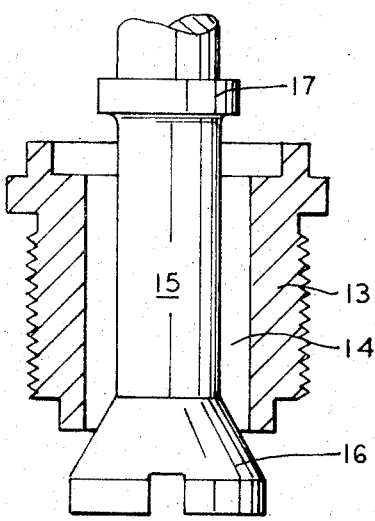
FIG. 9A is a view similar to FIG. 9 showing the valve when it is subjected to high inlet pressure.
Figure 10:
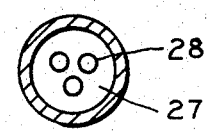
FIG. 10 is a fragmentary cross sectional view taken on the line 10—10 in FIG. 3.
Figure 11:
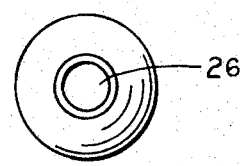
FIG. 11 is a fragmentary end view of the discharge nozzle of the fountain, as viewed from the line 11—11 in FIG. 3.

In the illustrative example, drawn to scale in FIG. 3, the regulator 1 is one which is rated for water pressure of from 10 p.s.i. to 80 p.s.i. In general, when so rated, it can produce essentially the same discharge stream from the nozzle N at any pressure within this range. The water pressure itself tends to unseat the head 17 suddenly at applied pressure near the upper end of the range and thereby causes a more rapid increase in the pressure in the cavity 11 and more rapid seating of the head 16. While raising the diaphragm 19, of course, assists in reducing the surge, the surge is eliminated essentially by the heads 16 and 17 themselves.

In the illustrative example, when the head 17 rises 1/32 of an inch or slightly more, the head 16 almost immediately starts restriction of the inlet end of the passage 14. When the head 16 rises 3/32 of an inch, it bottoms against the lower edges of the flat wall portions of the passage 14. Thus, in starting in the fully seated position of the head 16, downward movement of the stem 15 causes the head 17 to enter the outlet end of the passage 14 with a movement of only 3/32 of an inch. When the stem is fully down, the head 17 is seated by extending about 1/64 of an inch into the upper end of the passage 14. In general, the spring can be set so that, at from 25 to 30 pounds inlet pressure, the stem 15 and its heads 16 and 17 "float" in a position in which the limited flow passage between the stem and walls of the passage 14 is fully open. The stream produced at the nozzle is substantially the same regardless of pressure at the inlet 6.

The stem and its heads may be made of plastic, if desired, as also may the body 13.

Having thus described my invention, I claim:

1. A flow regulator comprising:

A valve body having an inlet passage and an outlet passage;

a seat member in the body between said passages and having a limited flow passage therethrough with an outlet, and with an inlet, which is connected with the inlet passage and being otherwise imperforate;

a continuously open restricted flow duct connecting the outlet with said outlet passage;

valve means in the body and operative when in a first position to restrict the outlet to a substantial flow less than normal limited flow, and to fully open the inlet, and when in a second position to restrict the inlet to a substantial flow less than normal limited flow, and fully open the outlet, and when in intermediate positions, to permit normal limited flow through the seat member, and being inoperative in any position to substantially close the inlet and the outlet, respectively, to a degree precluding any substantial flow through the member;

biasing means biasing the valve means to said one position;

the valve body having a cavity connected to said outlet and to said restricted flow duct;

fluid pressure operated means connected with said cavity so as to be responsive to the pressure of the fluid therein to set the valve means in said other positions.

2. The structure according to claim 1 wherein the limited flow passage is a lineal passage, its inlet is at one end and its outlet is at the other end;

the valve means includes a stem mounted in said body passage for movement endwise thereof in opposite directions;

the limited flow passage and stem are shaped differently in cross section and arranged so that a space for fluid flow is provided between their peripheral walls from the inlet to the outlet of the limited flow passage;

inlet and outlet valve heads are carried on opposite ends of the stem, respectively, and are movably thereby to and from said flow restricting positions relative to the opposite ends of the limited flow passage, respectively;

said heads and the inlet and outlet ends of the limited flow passage are shaped so that a more limited, but substantial, flow of fluid can pass between each head and the wall of its associated end of the limited flow passage while that head is in its maximum flow restricting position.

3. The structure according to claim 2 wherein the length of the stem between the heads is sufficiently greater than the distance between the maximum restricting positions, respectively, of the heads so that the stem constrains each head to an unrestricting position while the other head is in maximum restricting position.

4. The structure according to claim 2 wherein the flow capacity of the duct is equal to or less than the flow capacity of the limited flow passage when both heads are unseated.

5. The structure according to claim 2 wherein the flow capacity of the outlet duct, when the inlet head is in maximum restricting position is greater than the flow capacity of the limited flow passage.

6. The structure according to claim 2 wherein said fluid pressure operated means includes a diaphragm is sealed relation to the cavity and providing one wall thereof;

means connect the stem to the diaphragm;

the biasing means is a spring in the housing exteriorly of the cavity and connected to the stem and diaphragm and biasing the stem and diaphragm in a direction to move the outlet head to its maximum restricting position; and means to adjust the biasing force exerted by the spring on the stem and diaphragm.

7. The structure according to claim 2 wherein the valve heads are spaced so that the outlet head moves to fully open position before the inlet head reaches a restricting position.

8. The structure according to claim 2 wherein the inlet head is shaped relative to the inlet and the limited flow passage so that the inlet head can enter at least part way into the limited flow passage and progressively restrict the fluid flow space therethrough as the inlet head approaches its maximum restricting position.

9. The structure according to claim 2 wherein the outlet head is shorter than the inlet head.

* * * * *